United States Patent [19]

Tanaka et al.

[11] Patent Number: 5,042,929
[45] Date of Patent: Aug. 27, 1991

[54] PROJECTION LENS AND PROJECTION SYSTEM

[75] Inventors: Takaaki Tanaka; Yoshito Miyatake; Yuichi Kimura, all of Neyagawa, Japan

[73] Assignee: Matsushita Electric Industrial Co., Ltd., Osaka, Japan

[21] Appl. No.: 494,542

[22] Filed: Mar. 16, 1990

[30] Foreign Application Priority Data

Mar. 23, 1989 [JP] Japan ................... 1-070863

[51] Int. Cl.5 .................... G02B 13/04; G02B 17/00
[52] U.S. Cl. .................... 359/708; 359/752; 359/756; 359/726
[58] Field of Search .......... 350/463, 412, 479–483, 350/432, 469, 477, 445, 428, 458, 461, 464

[56] References Cited

U.S. PATENT DOCUMENTS

| | | | |
|---|---|---|---|
| 4,099,850 | 7/1978 | Matsui | 350/461 |
| 4,526,442 | 7/1985 | Betensky et al. | 350/412 |
| 4,744,641 | 5/1988 | Vanderwerf | 350/445 |
| 4,764,806 | 8/1988 | Altman | 350/412 |

FOREIGN PATENT DOCUMENTS 57-5488 12/1982 Japan.
62-125791 8/1987 Japan.

OTHER PUBLICATIONS

Recent Trends in Projection TV Receiver by Eiichi Yamazaki, Masanori Ogino (both of Yokohama Works, Hitachi Ltd., Yokohama), vol. 37, No. 2 (1983), pp. 82–89.
20.4:LCD Full-Color Video Projector, SID 86 Digest. 375, pp. 375–378, Shinji Morozumi, Tomio Sonehara, Hiroshi Kamakura, Takeshi Ono & Shuji Aruga (Seiko Epson Corp., Nagano-ken, (Japan).

*Primary Examiner*—Bruce Y. Arnold
*Assistant Examiner*—James Phan
*Attorney, Agent, or Firm*—Stevens, Davis, Miller & Mosher

[57] ABSTRACT

A projection lens enlarges and projects optical images in a matrix type light valve onto a screen. The projection lens includes a front lens group of the retrofocusing type; a rear lens with aspherical surfaces whose radii of curvature in the peripheral portion are shorter than that in the central portion; and a reflecting mirror which is positioned between the front lens group and the rear lens and diverts the optical axis. This projection lens enables the optical images in the light valve to be projected with a high contrast and a wide field angle. A projection system is provided which includes a light source; a light valve; a converging optical apparatus; a transmission type screen; diverting place mirrors; and a projection lens to enlarge and project the optical images in the light valve onto the screen. Since the projection lens has a wide field angle and has the reflecting mirror provided therein, the projection system can be very compact.

11 Claims, 8 Drawing Sheets

PROJECTION LENS AND PROJECTION SYSTEM

BACKGROUND OF THE INVENTION

The present invention relates to a projection system in which images which are formed in a matrix type light valve are irradiated by an illumination light beam to be projected onto a screen through a projection lens.

To obtain large pictures on a screen, a conventional method exists whereby the light beam from a light source is irradiated through a small light valve which forms optical images according to picture signals and the optical images are enlarged and projected onto the screen. In such a projection system, the resolution of projected images is almost determined by the resolution of the light valve itself, and the light output increases as the light flux of the light source is increased. Therefore, a projection system of a high resolution and a strong light output can be realized with a light valve of a high resolution and a strong light source, even if the image surface of the light valve is small. On the other hand, in recent years, a system using a liquid crystal as a light valve has been highlighted. For instance, in "LCD Full-Color Video Projector", SID 86, Digest, page 375, Morozumi et al. have proposed a projection system using a liquid crystal light valve of the active matrix type as the light valve (hereinafter called simply "light valve").

FIG. 7 shows an example of the fundamental construction of a conventional projection display system using a liquid crystal as a light valve. A light beam which is emitted from a light source 1 is transformed into an approximately parallel light beam by a converging optical apparatus 2 and is transmitted through a light valve 3 and enters a projection lens 4. The light valve 3 is constructed by arranging a liquid crystal cell 6 and polarizing plates 7 and 8 on both sides of the liquid crystal cell 6 to form a crossed Nicols or a parallel Nicols. Optical images corresponding to the picture signals are formed as spatial changes of light transmittance in the light valve 3, and the optical images are enlarged and projected onto a screen 5 through the projection lens 4. The optical system consisting of the elements from the light source 1 to the projection lens 4 is referred to as a projector 9.

FIG. 8 shows an example of a rear type projection system which is constructed using the projector 9. The light beam emitted from the projector 9 is transmitted via a first plane mirror 10 and a second plane mirror 11, being enlarged and projected onto the transmission type screen 5.

With the construction shown in FIG. 8, the depth of the projection system is determined by the depth of the projector 9 and the projection distance of the projection lens. Therefore, to realize a compact projection system, it is necessary to reduce the depth of the projector and to widen the field angle of the projection lens. However, the following problems must be solved relating to the projection lens.

(1) To project the optical images which are formed in the light valve in accordance with the picture signals onto the screen with a high contrast, it is necessary to make use of light rays which are emitted from the light valve plane at an angle near the right angle. Therefore, the projection lens needs to be constructed so that the principal rays of the projection lens are set to an angle within 15° from a normal of the liquid crystal light valve plane.

(2) Since matrix electrodes are used in the liquid crystal light valve, different from the CRT projection system, it is difficult to electrically correct figure distortions of the projected images. Therefore, it is necessary to set a distortion aberration of the projection lens to a value within ±1%.

The above-mentioned problems generally make it difficult to widen the field angle of the projection lens, and are not limited to the liquid crystal but are also common in a light valve employing the birefringence or optical rotary power of an electro-optic crystal, a PLZT, or the like, in which images are formed as spatial changes of light transmittance according to an electric signals.

SUMMARY OF THE INVENTION

It is an object of the present invention to provide a projection lens for projecting optical images in a light valve with a small distortion aberration, a high contrast and a wide field angle, and to provide a compact projection system with such a projection lens.

According to the present invention, there is provided a projection lens for enlarging and projecting optical images in a light valve onto a screen, comprising: a front lens group of the retrofocusing type which is positioned on the screen side; a rear lens which is positioned on the light valve side and comprises aspherical surfaces whose radii of curvature in the peripheral portion are shorter than that in the central portion; and a reflecting mirror which is positioned between the front lens group and the rear lens to divert the optical axis of the projection lens.

In addition, the first projection system according to the invention comprises: a light source; a light valve in which optical images according to picture signals are formed; a converging optical apparatus for irradiating a light beam emitted from the light source through the light valve; a transmission type screen; diverting plane mirrors; and a projection lens for enlarging and projecting the optical images onto the screen.

The second projection system according to the invention comprises: a light source; three light valves in which optical images are formed according to picture signals; a converging optical apparatus for irradiating the light beam emitted from the light source through the light valves; dichroic mirrors for separating the light beam from the converging optical apparatus into the color light rays of red, green, and blue; a transmission type screen; diverting plane mirrors; and three projection lenses for enlarging and projecting the optical images in the light valves onto the screen.

According to the invention, a wide field angle of the projection lens can be realized without reducing a peripheral light amount by constructing the front lens group of the projection lens with a retrofocusing type lens arrangement. When a small F number is intended for a retrofocusing type lens, aberrations such as distortion aberration, astigmatism, chromatic aberration of magnification or the like are likely to occur. However, those aberrations can be satisfactorily corrected and a brighter projection lens can be realized by positioning the rear lens comprising aspherical surfaces just before the light valve. With the above construction, a projection lens of a wide field angle of 72° is realized, which enables the optical images in the light valve to be enlarged and projected with a high contrast. The depth of the projector can be reduced by providing the reflecting mirror to divert the optical axis of the projection lens.

The first projection system according to the invention provides the projection lens of a wide field angle having therein the reflecting mirror to divert the optical axis, so that the depth of the projector can be reduced, and a compact projection system can be realized.

The second projection system of the invention provides three light valves, so that it is possible to display a bright picture with a high resolution. Further, since the projection system provides three projection lenses of wide field angles having therein reflecting mirrors, a compact projection system can be realized.

DESCRIPTION OF THE PREFERRED EMBODIMENTS

Figure 1:
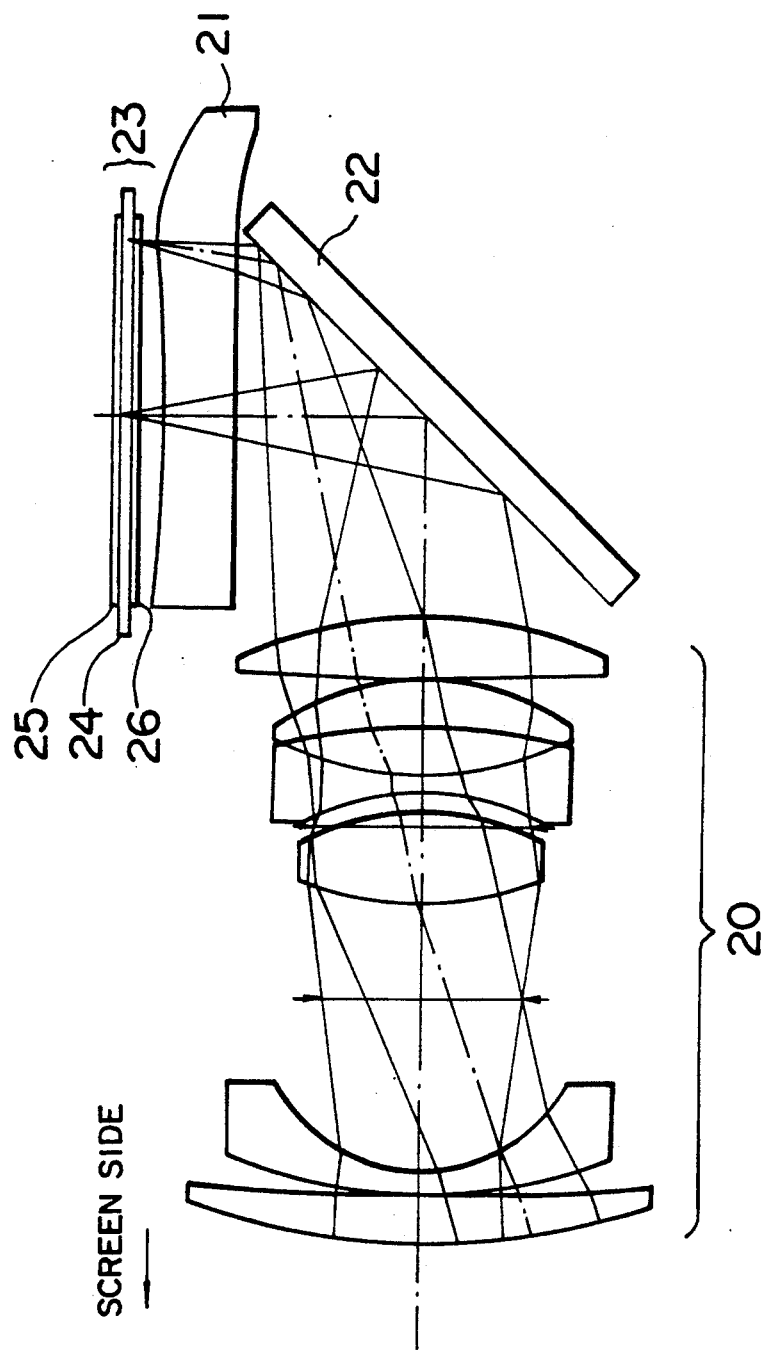
FIG. 1 shows a construction and an optical path of the first embodiment of a projection lens according to the present invention.

FIG. 1 is a schematic constructional view showing a projection lens in accordance with the first embodiment of the present invention. In FIG. 1, reference numeral 20 denotes the front lens group of the retrofocusing type; 21 indicates the rear lens-comprising aspherical surfaces whose radii of curvature in the peripheral portion are shorter than that in the central portion; 22 a reflecting mirror; and 23 a light valve. The light valve 23 is of the active matrix type and comprises: a liquid crystal cell 24 of the twisted nematic mode; and polarizing plates 25 and 26 which are positioned on both sides of the liquid crystal cell 24 to form a crossed Nicols or a parallel Nicols.

The front lens group 20 is constructed with six lenses comprising, from the screen side, a first lens of a positive lens, a second lens of a negative meniscus, a third lens whose both sides are formed in a convex shape, a fourth lens whose both sides are formed in a concave shape, a fifth lens of a positive meniscus whose concave surface faces the screen side, and a sixth lens of a positive lens.

With the retrofocusing type front lens group, the field angle of the projection lens can be widened without decreasing the peripheral light amount and the projection distance can be reduced.

Generally, in the case of retrofocusing type lens, aberrations such as distortion aberration, astigmatism, chromatic aberration of magnification or the like are likely to occur, and when a small F number of the lens is intended, it is difficult to satisfactorily correct those aberrations. Therefore, in the invention, the rear lens 21, comprising aspherical surfaces whose radii of curvature in the peripheral portion are shorter than that in the central portion, is positioned just before the light valve 23. With the above-mentioned rear lens, the effective positive power of the marginal rays is set to be more intense than the paraxial power and the peripheral light rays can be easily transmitted at an angle which is nearly parallel to the normal of the plane of the light valve 23, and the aberrations, particularly, the distortion aberration, can be adequately corrected. In addition, by setting the paraxial power of the rear lens 21 to a negative value, the Petzval sum of the overall projection lens system is reduced and the curvature of field is also satisfactorily corrected.

Further, if the rear lens 21 is made of plastics, there are advantages that the weight thereof can be reduced and the lens can be more easily shaped by molding or the like.

Since the back focal distance of the front lens group can be set to a large value because the front lens group 20 is of the retrofocusing type, and since the rear lens 21 is positioned close to the light valve 23, a space sufficient to position the reflecting mirror 22 to divert the optical axis of the projection lens can be assured between the front lens group 20 and the rear lens 21. As shown in FIG. 1, sufficient space to position the reflecting mirror 22 can be easily assured if a part of the rear lens 21 is cut out so that the rear lens 21 does not come into contact with the front lens group 20, and in such a range that the effective luminous flux is not eclipsed.

It is most desirable to position the reflecting mirror 22 in a manner such that the diversion angle between the optical axis of the rear lens 21 and the optical axis of the front lens group 20 is 90°. When the optical axis diversion angle is set to an acute angle, the portion of the rear lens 21 coming into contact with the front lens group 20 is larger, so that, a larger cut-out portion is needed. Therefore, the surface shape of the lens is lost and the effective area of the rear lens 21 cannot be assured. In addition, the light valve 23 comes into contact with the front lens group 21 and the optical system cannot be constructed. On the contrary, when the optical axis diversion angle is set to an obtuse angle, a larger reflecting mirror 22 is needed, and the back focal distance of the front lens group 20 needs to be longer, so that, it is difficult to provide a good performance of the projection lens. The depth of the projection lens can be reduced by positioning the reflecting mirror 22 to divert the optical axis at a position between the front lens group 20 and the rear lens 21.

The correction of the chromatic aberration is also important for the projection lens with the construction as shown in FIG. 1. As for the rear lens 21, only a slight amount of magnification chromatic aberration occurs since the rear lens 21 is positioned near the light valve 23. Therefore, a satisfactory correction of the magnification chromatic aberration of the front lens group 20 is needed, and so, the following condition needs to be satisfied.

$$-2.0 < f_{1\nu 1}/f_{2\nu 2} < -1.0 \quad (1)$$

The above condition specifies the focal distances and Abbe's numbers of the first and second lenses in the front lens group in order to correct the chromatic aberration. When exceeding the upper limit value of the above condition, the longitudinal chromatic aberrations which occur in the first and second lenses of the front lens group become excessive, while a correction of the magnification chromatic aberration of the front lens group is possible. Accordingly, it becomes difficult to correct the longitudinal chromatic aberrations within a group of lenses which follow after the first and second lenses. On the contrary, when exceeding the lower limit of the above condition, it is difficult to correct the magnification chromatic aberration.

Two preferred embodiments of the projection lens according to the present invention will be shown below. In the embodiments, $r_1, r_2, \ldots$ denote radii of curvature of the respective surfaces when they are sequentially seen from the screen side; $d_1, d_2, \ldots$ indicate surface separations among the respective surfaces; $n_1, n_2, \ldots$ represent refractive indices of the lenses for the e rays; and $\nu_1, \nu_2, \ldots$ denote Abbe's numbers of the lenses for the e rays. *1 and *2 indicate aspherical surfaces of the rear lens 21, where the surface facing to the light valve 23 is denoted *2. Assuming that X indicates a deviation amount from the vertex of the lens at the position of a radial distance Y of an opening from the optical axis of the lens, it is expressed by the following equation.

$$X = \frac{Y^2/r}{1 + \sqrt{1 - (K+1)\cdot(Y/r)^2} + AD\cdot Y^4 + AE\cdot Y^6 + AF\cdot Y^8 + AG\cdot Y^{10}}$$

AD, AE, AF, and AG denote aspherical coefficients and K indicates a conical constant.

An F number is shown by F and a field angle is indicated by $2\omega$.

FIRST EMBODIMENT $f = 54.3, F = 2.4, 2\omega = 72$,
Where f represents focal length First embodiment

| | | |
|---|---|---|
| $r_1 = 93.372$ | $d_1 = 6.50$ | |
| | $n_1 = 1.7293$ | $\nu_1 = 38.0$ |
| $r_2 = 368.524$ | $d_2 = 0.30$ | |
| | $n_2 = 1.0$ | |
| $r_3 = 66.827$ | $d_3 = 3.00$ | |
| | $n_3 = 1.51815$ | $\nu_2 = 64.1$ |
| $r_4 = 22.274$ | $d_4 = 35.00$ | |
| | $n_4 = 1.0$ | |
| $r_5 = 43.546$ | $d_5 = 12.00$ | |
| | $n_5 = 1.69644$ | $\nu_3 = 36.1$ |
| $r_6 = -43.546$ | $d_6 = 2.92$ | |
| | $n_6 = 1.0$ | |
| $r_7 = -34.786$ | $d_7 = 3.00$ | |
| | $n_7 = 1.69389$ | $\nu_4 = 56.9$ |
| $r_8 = 47.625$ | $d_8 = 5.70$ | |
| | $n_8 = 1.0$ | |
| $r_9 = -95.347$ | $d_9 = 6.50$ | |
| | $n_9 = 1.62542$ | $\nu_5 = 56.9$ |
| $r_{10} = -36.347$ | $d_{10} = 0.30$ | |
| | $n_{10} = 1.0$ | |
| $r_{11} = 464.326$ | $d_{11} = 7.50$ | |
| | $n_{11} = 1.68066$ | $\nu_6 = 55.5$ |
| $r_{12} = -69.785$ | $d_{12} = 26.5$ | |
| | $n_{12} = 1.0$ | |
| $r_{13} = \infty$ | $d_{13} = 25.4$ | |
| | $n_{13} = -1.0$ | |
| $r_{14} = 333.333$ | $d_{14} = 9.80$ *1 | |
| | $n_{14} = 1.49373$ | $\nu_7 = 57.2$ |
| $r_{15} = 163.934$ | $d_{15} = 4.50$ *2 | |
| | $n_{15} = 1.0$ | |
| $r_{16} = \infty$ | $d_{16} = 1.80$ | |
| | $n_{16} = 1.50$ | |

-continued $f = 54.3, F = 2.4, 2\omega = 72$,
Where f represents focal length $r_{17} = \infty$

*1
$K = -650.095$
$AD = -7.32271 \times 10^{-7}$
$AE = 7.32634 \times 10^{-11}$
$AF = -6.83865 \times 10^{-14}$
$AG = -2.26308 \times 10^{-19}$
*2
$K = 11.3124$
$AD = -1.74325 \times 10^{-6}$
$AE = -1.24408 \times 10^{-9}$
$AF = -1.89063 \times 10^{-13}$
$AG = 1.87837 \times 10^{-17}$ Second embodiment

| | | |
|---|---|---|
| $r_1 = 90.598$ | $d_1 = 8.44$ | |
| | $n_1 = 1.69389$ | $\nu_1 = 30.9$ |
| $r_2 = 437.144$ | $d_2 = 0.50$ | |
| | $n_2 = 1.0$ | |
| $r_3 = 81.682$ | $d_3 = 3.55$ | |
| | $n_3 = 1.51815$ | $\nu_2 = 64.1$ |
| $r_4 = 23.440$ | $d_4 = 34.00$ | |
| | $n_4 = 1.0$ | |
| $r_5 = 46.816$ | $d_5 = 14.10$ | |
| | $n_5 = 1.69644$ | $\nu_3 = 36.1$ |
| $r_6 = -50.340$ | $d_6 = 3.56$ | |
| | $n_6 = 1.0$ | |
| $r_7 = -38.127$ | $d_7 = 3.37$ | |
| | $n_7 = 1.69389$ | $\nu_4 = 56.9$ |
| $r_8 = 52.944$ | $d_8 = 5.67$ | |
| | $n_8 = 1.0$ | |
| $r_9 = -93.148$ | $d_9 = 6.50$ | |
| | $n_9 = 1.62542$ | $\nu_5 = 56.9$ |
| $r_{10} = -33.956$ | $d_{10} = 0.50$ | |
| | $n_{10} = 1.0$ | |
| $r_{11} = 218.041$ | $d_{11} = 10.31$ | |
| | $n_{11} = 1.68066$ | $\nu_6 = 55.5$ |
| $r_{12} = -86.691$ | $d_{12} = 25.0$ | |
| | $n_{12} = 1.0$ | |
| $r_{13} = \infty$ | $d_{13} = 24.5$ | |
| | $n_{13} = -1.0$ | |
| $r_{14} = 478.206$ | $d_{14} = 9.84$ *1 | |
| | $n_{14} = 1.49373$ | $\nu_7 = 57.2$ |
| $r_{15} = 165.096$ | $d_{15} = 3.50$ *2 | |
| | $n_{15} = 1.0$ | |
| $r_{16} = \infty$ | $d_{16} = 1.80$ | |
| | $n_{16} = 1.50$ | |
| $r_{17} = \infty$ | | |

Figures 2A, 2B, 2C:
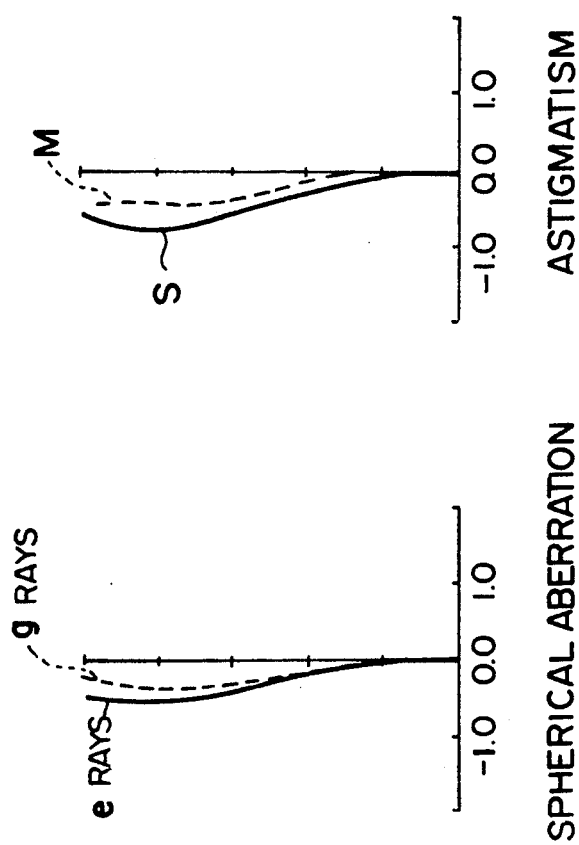
FIGS. 2A to 2C are characteristic graphs showing a spherical aberration, an astigmatism, and a distortion aberration in the first embodiment, respectively.
Figure 3A:
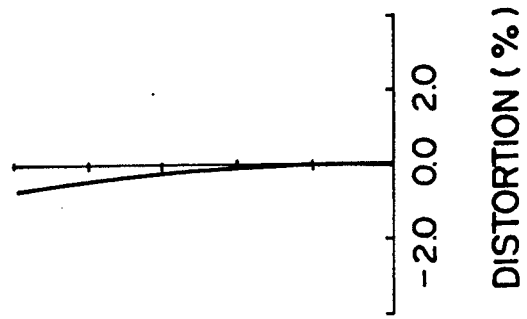
FIGS. 3A to 3C are characteristic graphs showing a spherical aberration, an astigmatism, and a distortion aberration in the second embodiment, respectively.
Figure 3B:
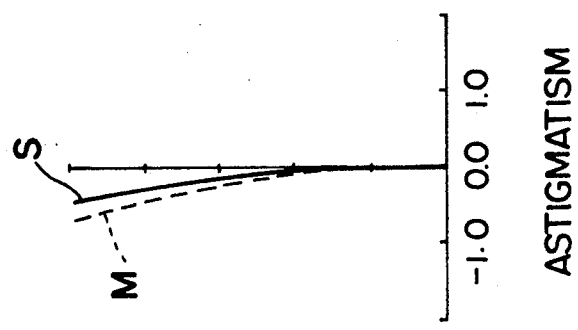

*1
$K = 3.26392$
$AD = -9.32108 \times 10^{-7}$
$AE = 2.14344 \times 10^{-10}$
$AF = -2.66231 \times 10^{-13}$
$AG = -8.12476 \times 10^{-17}$
*2
$K = 11.3124$
$AD = -1.74325 \times 10^{-6}$
$AE = -1.24408 \times 10^{-9}$
$AF = -1.89063 \times 10^{-13}$
$AG = 1.87837 \times 10^{-17}$ FIGS. 2A to 2C and 3A to 3C are characteristic graphs showing spherical aberrations, astigmatisms, and distortion aberrations based on the first and second embodiments, respectively. In FIGS. 2A and 3A, a solid line indicates an aberration for the e rays and a broken line represents an aberration for the g rays. It will be understood from the graphs that the longitudinal chromatic aberration was satisfactorily corrected. In FIGS. 2B and 3B, a solid line indicates an aberration in the sagittal direction and a broken line represents an aberration in the meridional direction. By setting a paraxial power of the rear lens 21 to a negative value, the Petzval sum of the overall projection lens system is reduced and the curvature of field is well corrected.

Figure 3C:
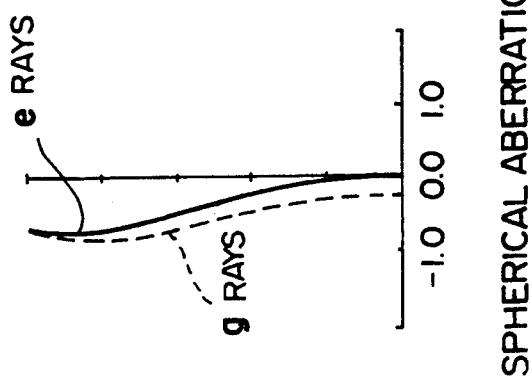

The distortion aberration is well corrected owing to the effect of the aspherical surfaces of the rear lens 21. As shown in FIGS. 2C and 3C, the distortion aberration is suppressed to a practically negligible value within −0.7%. In addition, the incident angle of the marginal rays onto the light valve 23 is set to near the right angle by the rear aspherical surface lens. Therefore, the aperture of the front lens group is kept not so large and the size and costs of the projection lens can also be reduced.

Figure 4:
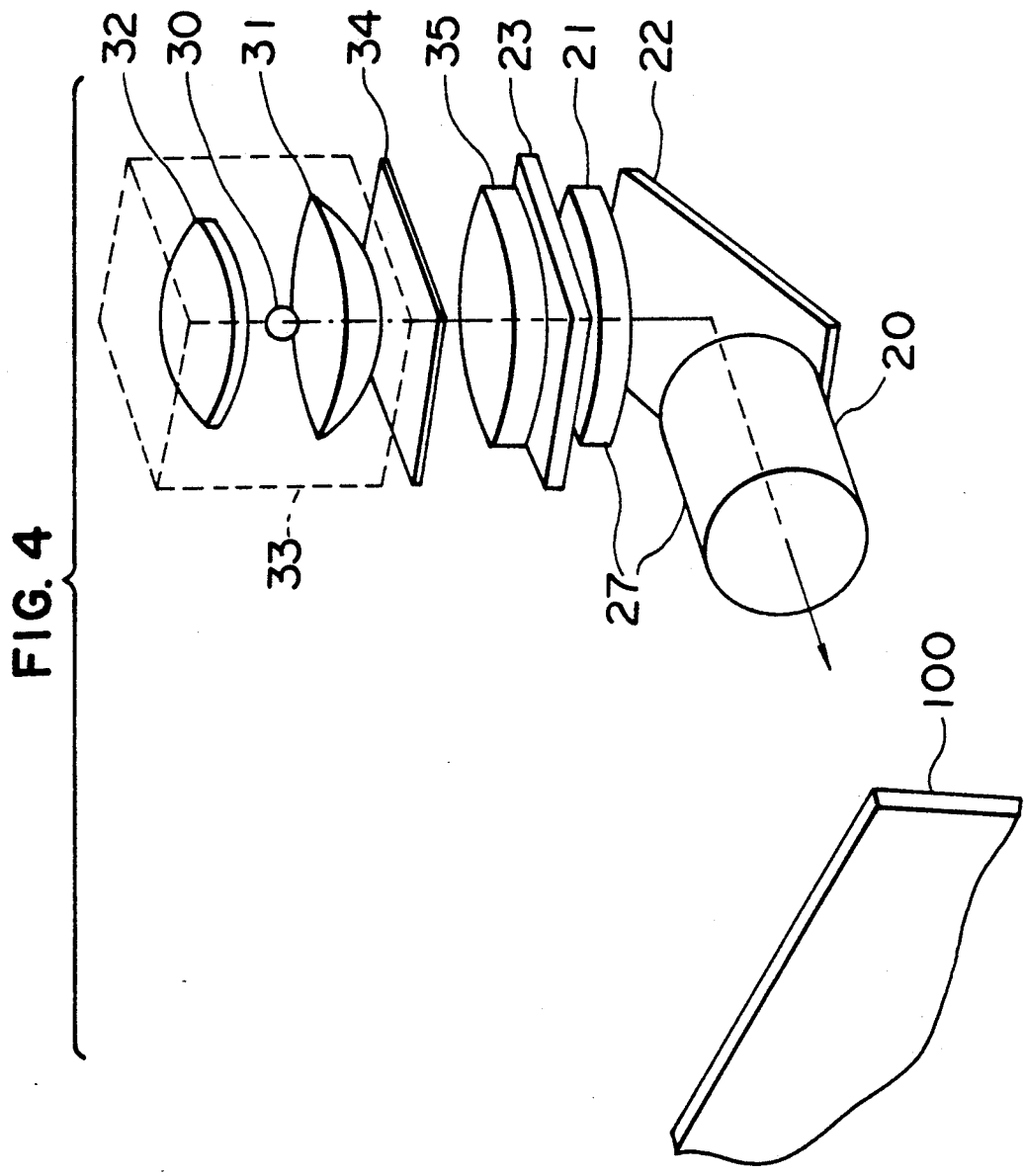
FIG. 4 is a constructional view of a projector of a projection system in the third embodiment of the present invention.

FIG. 4 shows a construction of a projector for a projection system in accordance with the third embodiment of the present invention. In FIG. 4, reference numeral 27 denotes a projection lens comprising the front lens group 20 and the rear lens 21; 30 indicates a light source; 31 a condenser lens; 32 a concave mirror; 33 a converging optical apparatus comprising the condenser lens 31 and the concave mirror 32; 34 a heat absorbing glass; and 35 a field lens.

The light beam which is emitted from the light source 30 such as a metal halide lamp, xenon lamp, halogen lamp, etc. is transformed into an approximately parallel light beam by the converging optical apparatus 33. The infrared rays are absorbed by the heat absorbing glass 34, thereby preventing heat from being propagated in the frontward direction. The light beam which was transformed into an approximately parallel light beam passes through the field lens 35 and, thereafter, it enters the light valve 23 of the active matrix type which forms optical images as spatial changes in light transmittance corresponding to the picture signals. The optical image formed in the light valve 23 is enlarged and projected onto a screen 100 by the projection lens 27 provided therein with the reflecting mirror 22 to divert the optical axis.

The field lens 35 is used to allow light rays which pass through the peripheral portion of the light valve 23 to enter into the projection lens 27. A focal point of the field lens 35 is set to a position near the center of the pupil of the projection lens 27.

The relative positions of the rear lens 21 and reflecting mirror 22 of the projection lens 27 are fixed. The position of the front lens group 20 can be adjusted along the optical axis. As the result, an enlargement magnification and a focal point can be easily adjusted by adjusting the position of the front lens group 20.

Figure 5:
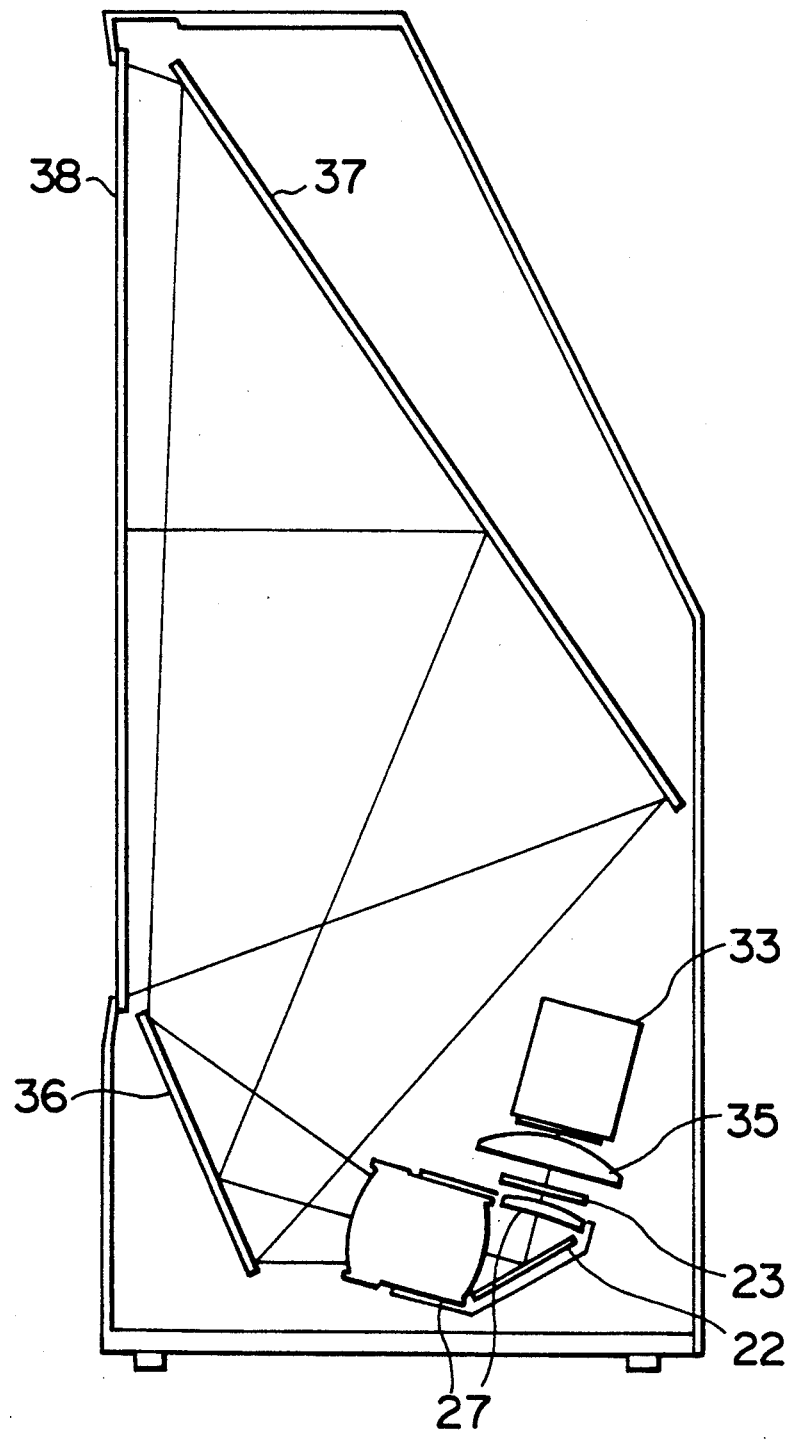
FIG. 5 is a constructional view of the projection system in the third embodiment of the invention.

FIG. 5 shows a construction of a projection system of the rear type using the projector of FIG. 4. The light beam which is emitted from the projecting lens 27 is projected onto a transmission type screen 38 after being reflected by the first diverting plane mirror 36 and the second diverting plane mirror 37. The light beam emitted from the projection lens is directed upwardly to prevent the light beam reflected by the diverting plane mirror 36 from being eclipsed by the front portion of the projection lens 27 or by the rear portion of the converging optical apparatus 33.

With the above construction, a design object where the optical image which is formed by the light valve having a diagonal length of 2.8 inches is enlarged and projected onto the screen to a size of 40 inches can be attained by a very compact projection system having external dimensions of a width of 886 mm, a height of 861 mm, and a depth of 400 mm. To construct a compact projection system, diversion of the optical axis between the converging optical apparatus 33 and the light valve 23 might also be considered. However, by such a measure, the reduction in the depth of the projector is not so large, and a compact size projection system cannot be realized.

According to the present invention, the reflecting mirror 22 to divert the optical axis is provided in the projection lens 27, so that a compact projector can be constructed. Further, employing such a projector, a compact size projection system can be realized since the reflecting mirror to divert the optical axis is provided in the projection lens, since the field angle of the projection lens is large, since the light beam emitted from the projection lens is irradiated upwardly, and since the light valve is small-sized.

Figure 6:
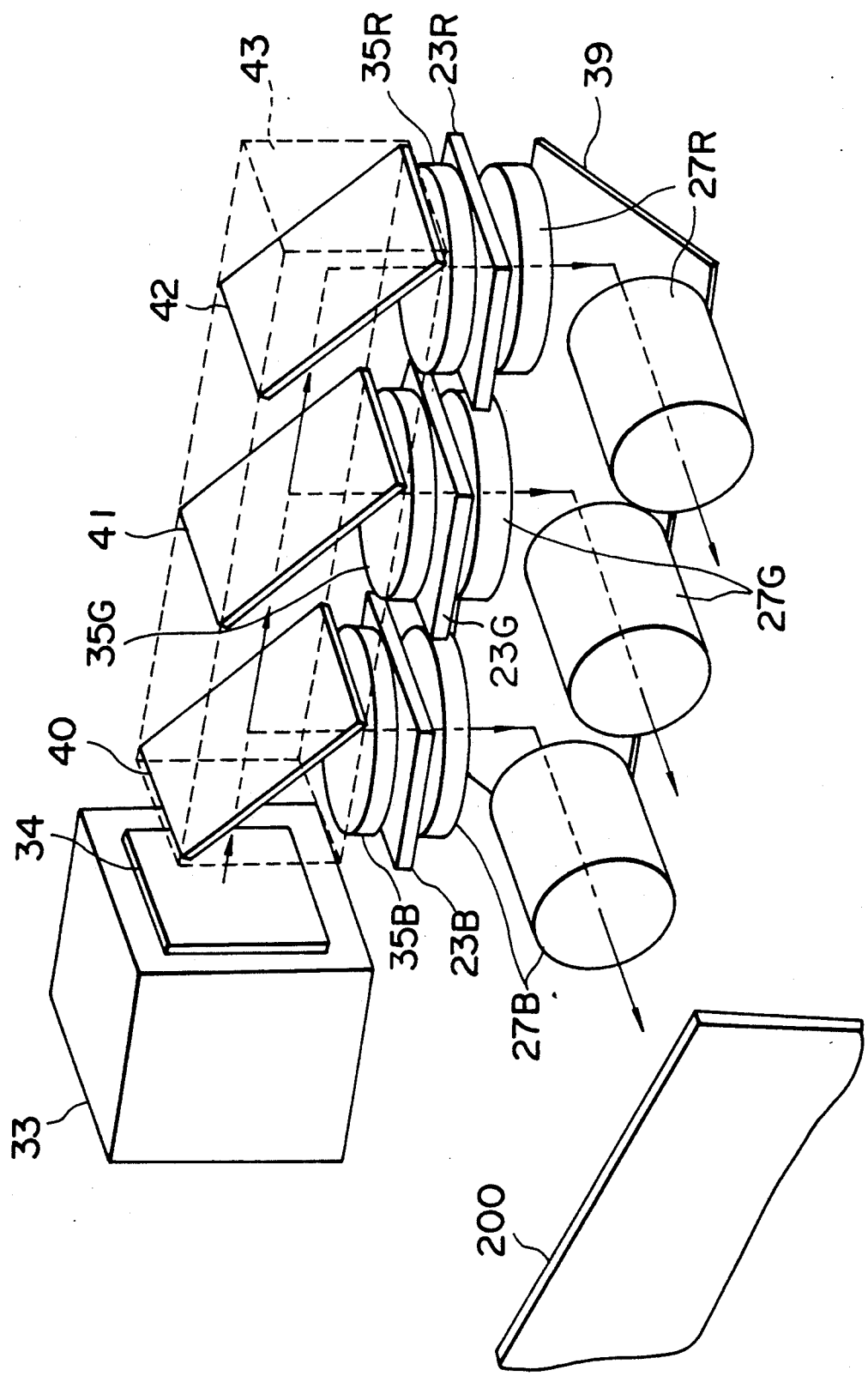
FIG. 6 is a constructional view of a projector of a projection system in the fourth embodiment of the invention.
Figure 7:
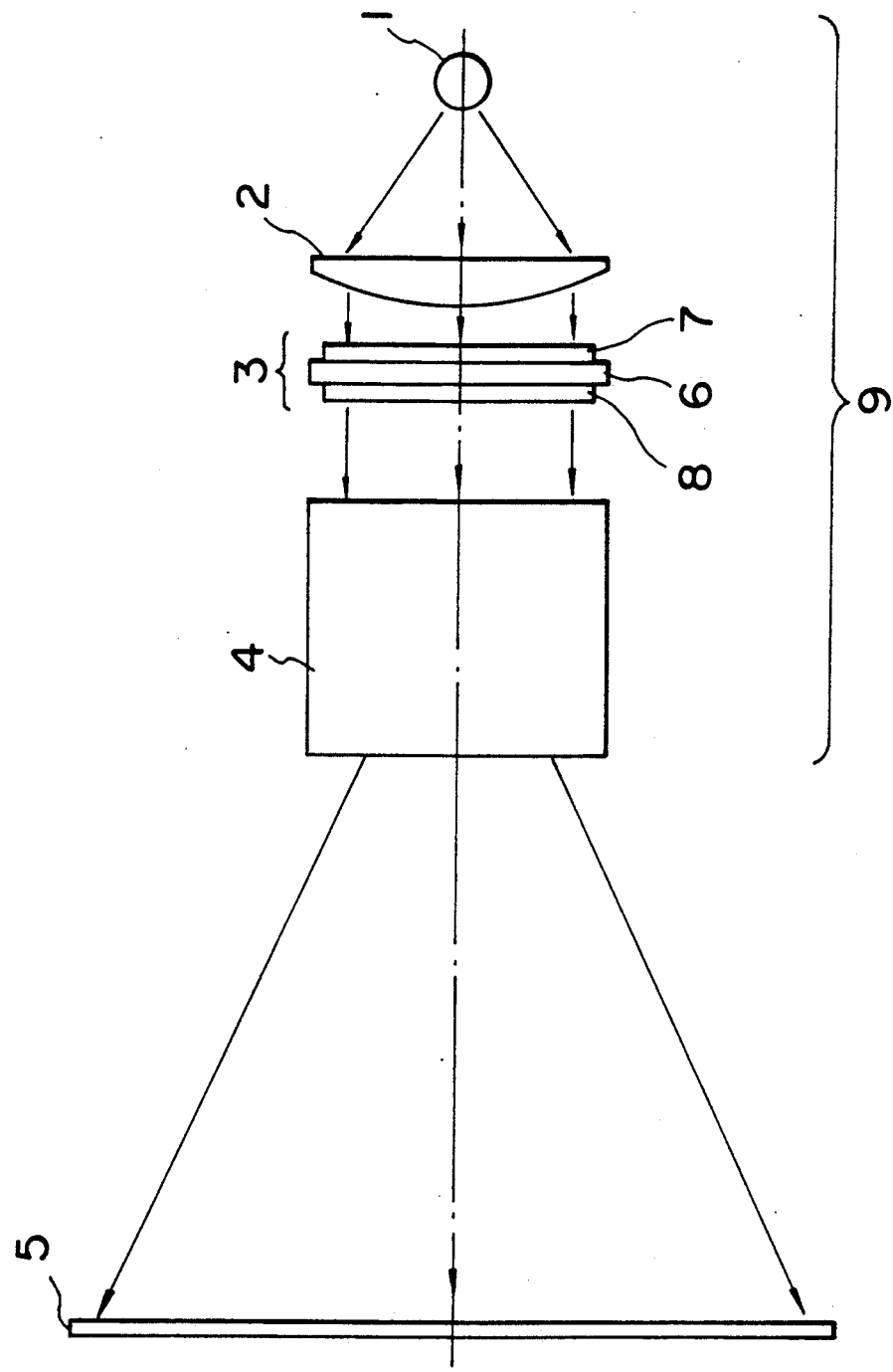
FIGS. 7 and 8 are fundamental constructional views of a conventional projection system.
Figure 8:
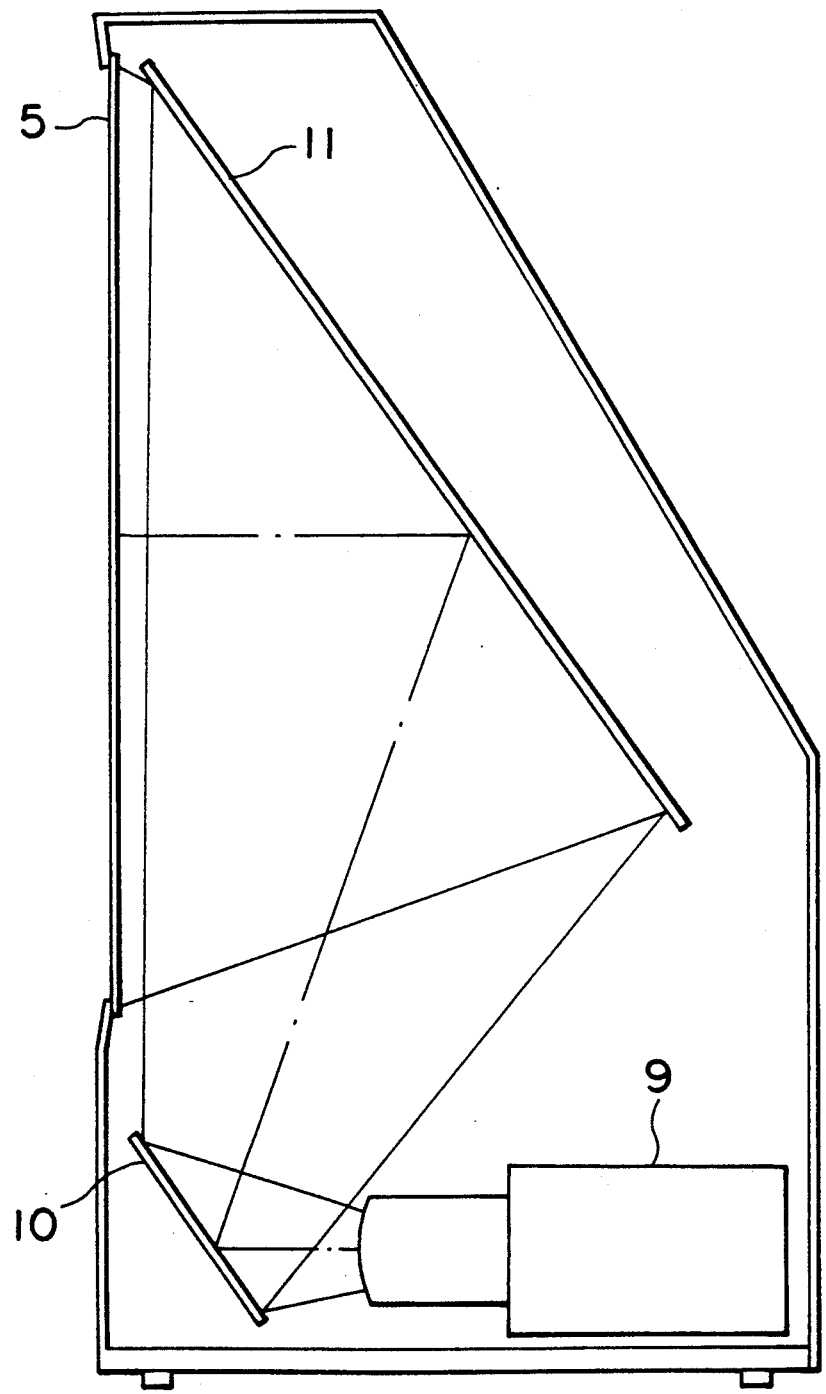

FIG. 6 shows a constructional view of a projector for a projection system in accordance with the fourth embodiment of the present invention. In FIG. 6, the converging optical apparatus 33, heat absorbing glass 34, field lenses 35B, 35G, and 35R, light valves 23B, 23G, and 23R, and projection lenses 27B, 27G, and 27R are similar to those in FIG. 4. Reference numeral 40 denotes a dichroic mirror to reflect the blue light; 41 indicates a dichroic mirror to reflect the green light; and 42 a dichroic mirror to reflect the red light. Reference numeral 43 represents a color separation optical apparatus comprising the dichroic mirrors 40, 41, and 42. The three light valves 23B, 23G, and 23R corresponding to the color light rays of blue, green, and red are positioned on the same flat surface. The optical axes of the front lens group of the three projection lenses 27B, 27G, and 27R are positioned in parallel with one another. A single reflecting mirror 39 is provided between the front lens group and the rear lenses of the three projection lenses 27B, 27G, and 27R to divert the optical axes thereof.

The light which is emitted from the light source is transformed into an approximately parallel light beam by the converging optical apparatus 33. The infrared rays are absorbed by the heat absorbing glass 34, thereby preventing heat from being propagated in the frontward direction. The white light which was transformed into an approximately parallel light beam enters the color separation optical apparatus 43. The white light first enters the blue-reflection dichroic mirror 40, so that the blue component is reflected and the red and green components are transmitted. Then, the transmitted light enters the green-reflection dichroic mirror 41, so that only the green component is reflected and the red component is transmitted. Finally, the red component is reflected by the red-reflection dichroic mirror 42 and the unnecessary color components are transmitted. Thus, the respective color light rays are sequentially separated into the blue, green, and red light rays. Each separated color light ray passes through each of the three field lenses 35B, 35G, and 35R and, thereafter, enters each of the three light valves 23B, 23G, and 23R positioned on the same flat surface. The light valves 23B, 23G, and 23R form optical images as spatial changes of light transmittance in accordance with the picture signals. Each optical image formed by each of the light valves 23B, 23G, and 23R corresponding to the respective colors is enlarge and projected onto a screen 200 through each of the projection lenses 27B, 27G, and 27R which share a single reflecting mirror 39 to divert the respective optical axes, and the blue, green, and red images are synthesized on the screen. To synthesize the projected images from the three light valves 23B, 23G, and 23R on the screen, the positions on the flat surface and inclination angles of the two light valves 23B and 23R other than the central light valve 23G are finely adjusted against the optical axes of the projection lenses 27B and 27R, thereby overlapping the blue, green, and red projected images on the screen.

As the optical images which are formed in the three light valves 23B, 23G, and 23R are enlarged and projected onto the screen through the three projection lenses 27B, 27G, and 27R and the projected images of the respective colors are synthesized on the screen, a full-color high resolution image can thus be displayed.

Since the three light valves 23B, 23G, and 23R are positioned on the same flat surface, the convergence can be easily adjusted by the mechanical adjustment of the light valves on that flat surface. Since the optical axes of the front lens group of the three projection lenses 27B, 27G, and 27R are parallel, no trapezoidal distortion occurs in the projected images. Since the reflecting mirror 39 which is included in the three projection lenses 27B, 27G, and 27R is a single mirror, the reflecting mirror 39 is mechanically strong and the angles between the optical axes of the projection lenses 27B, 27G, and 27R for the respective colors and the normal of the reflecting mirror 39 can be set to the same angle.

According to the invention, since the reflecting mirror to divert the optical axes is provided in the projection lenses, since the three projection lenses are arranged in the horizontal direction, and since the dichroic mirrors for separating the white light into the blue, red, and green light rays are arranged in a row according to sequential separation scheme, the projector can be made compact. Further, the projection system using the above-mentioned projector is also made very compact, similarly to the third embodiment.

In the third embodiment, a projection system of the full-color display which provides the red, blue, and green color filters for the respective light valves 23 can also be constructed. Although the first to fourth embodiments relate to the systems in which liquid crystal light valves are used, the invention is not limited to liquid crystal light valves, but it is also possible to use light valves of the type employing a PLZT, an electro-optic crystal, or the like having electro-optical effects.

WHAT IS CLAIMED IS:

1. A projection lens for enlarging and projecting optical images in a light valve onto a screen, comprising:
    a front lens group of a retrofocusing type which is positioned on the screen side;
    a rear lens which is positioned on the light valve side and comprises aspherical surfaces whose radii of curvature in the peripheral portion are shorter than that in the central portion; and
    a reflecting mirror which is positioned between said front lens group and said rear lens and diverts the optical axis of said projection lens.

2. A projection lens according to claim 1, wherein the front lens group is constructed with six lenses and comprises, from the screen side, a positive first lens, a second lens of a negative meniscus, a third lens whose both side surfaces are formed in a convex shape, a fourth lens whose both side surfaces are formed in a concave shape, a fifth lens of a positive meniscus whose concave surface faces the screen side, and a positive sixth lens, and satisfy the following condition $$-2.0 < f_1\nu_1/f_2\nu_2 < -1.0$$

where, $f_1$ and $\nu_1$ denote a focal distance and an Abbe's number of said first lens and $f_2$ and $\nu_2$ indicate a focal distance and an Abbe's number of said second lens, respectively.

3. A projection lens according to claim 1, wherein a paraxial power of said rear lens is set to a negative value.

4. A projection lens according to claim 1, wherein a peripheral power of said rear lens is set to a positive value.

5. A projection lens according to claim 1, wherein said rear lens is a plastic lens.

6. A projection lens according to claim 1, wherein the relative positions of said rear lens and said reflecting mirror are fixed and the position of said front lens group against said rear lens can be adjusted along the optical axis of said front lens group.

7. A projection system comprising:
    a light source;
    a light valve in which optical images corresponding to picture signals are formed;
    a converging optical apparatus for irradiating a light beam emitted from said light source into said light valve;
    a transmission type screen;
    diverting plane mirrors; and
    a projection lens for enlarging and projecting said optical images onto said screen;
    wherein a projection lens according to claim 1 is used for said projection lens.

8. A projection system comprising:
    a light source;
    three light valves in which optical images corresponding to picture signals are formed;
    a converging optical apparatus for irradiating light beam emitted from said light source into said light valves;
    dichroic mirrors for separating the light from said converging optical apparatus into red, green, and blue light rays;
    a transmission type screen;
    diverting plane mirrors; and
    three projection lenses for enlarging and projecting said optical images from each of the light valves onto said screen;
    wherein a projection lens according to claim 1 is used for each of said projection lenses.

9. A system according to claim 8, wherein a single reflecting mirror is shared by said three projection lenses in place of respective reflecting mirrors.

10. A system according to claim 8, wherein optical image forming surfaces of the three light valves are located on a same flat surface.

11. A system according to claim 8, wherein optical axes of said front lens group of said three projection lenses are parallel.

* * * * *